United States Patent

[11] 3,620,608

| [72] | Inventor | Jeannette Davis<br>1320 Midvale Ave., Los Angeles, Calif. 90024 |
|---|---|---|
| [21] | Appl. No. | 25,922 |
| [22] | Filed | Apr. 6, 1970 |
| [45] | Patented | Nov. 16, 1971<br>Continuation-in-part of application Ser. No. 762,799, Sept. 26, 1968, now abandoned. This application Apr. 6, 1970, Ser. No. 025,922 |

[54] EYEGLASS ASSEMBLY
5 Claims, 11 Drawing Figs.
[52] U.S. Cl. ............................................. 351/111, 351/117, 351/118, 351/123
[51] Int. Cl. ............................................. G02c 5/14
[50] Field of Search ............................................. 351/111, 123, 118, 117

[56] References Cited
UNITED STATES PATENTS

| 503,803 | 8/1893 | Orth | 351/111 |
| 3,361,514 | 1/1968 | Davis | 351/118 |
| 3,502,396 | 3/1970 | Greenberg | 351/157 |

*Primary Examiner*—David Schonberg
*Assistant Examiner*—John W. Leonard
*Attorney*—Jessup & Beecher ABSTRACT: An improved eyeglass assembly is provided in the form, for example, of a pair of spectacles having a resilient frame which may be composed of a light resilient plastic, and which includes side bows which are shaped and configured so that the assembly may be securely and firmly supported against the side of the head of the wearer and out of engagement with the bridge of the wearer's nose. In one embodiment, the side bows are adjustable so as to fit different head sizes.

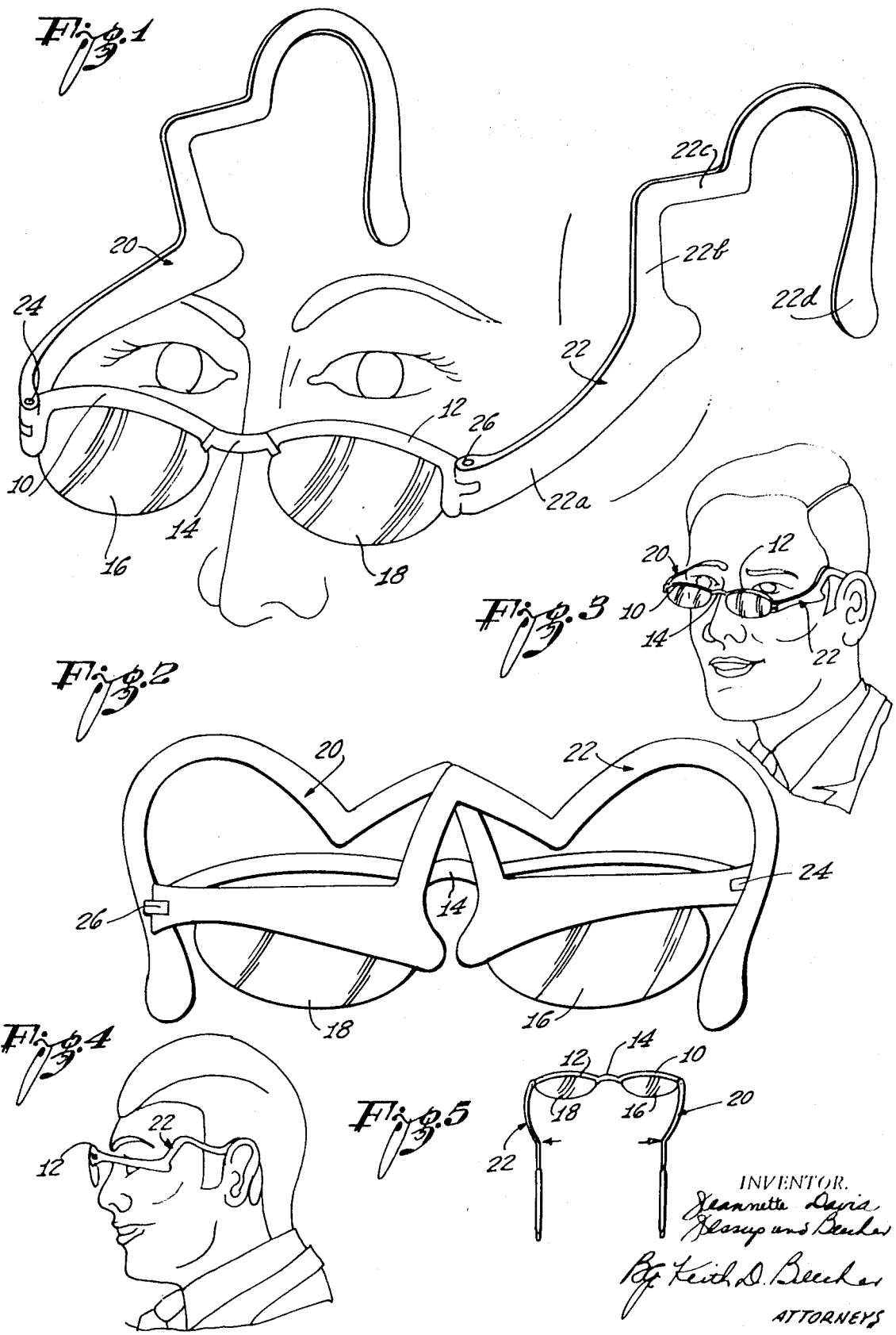

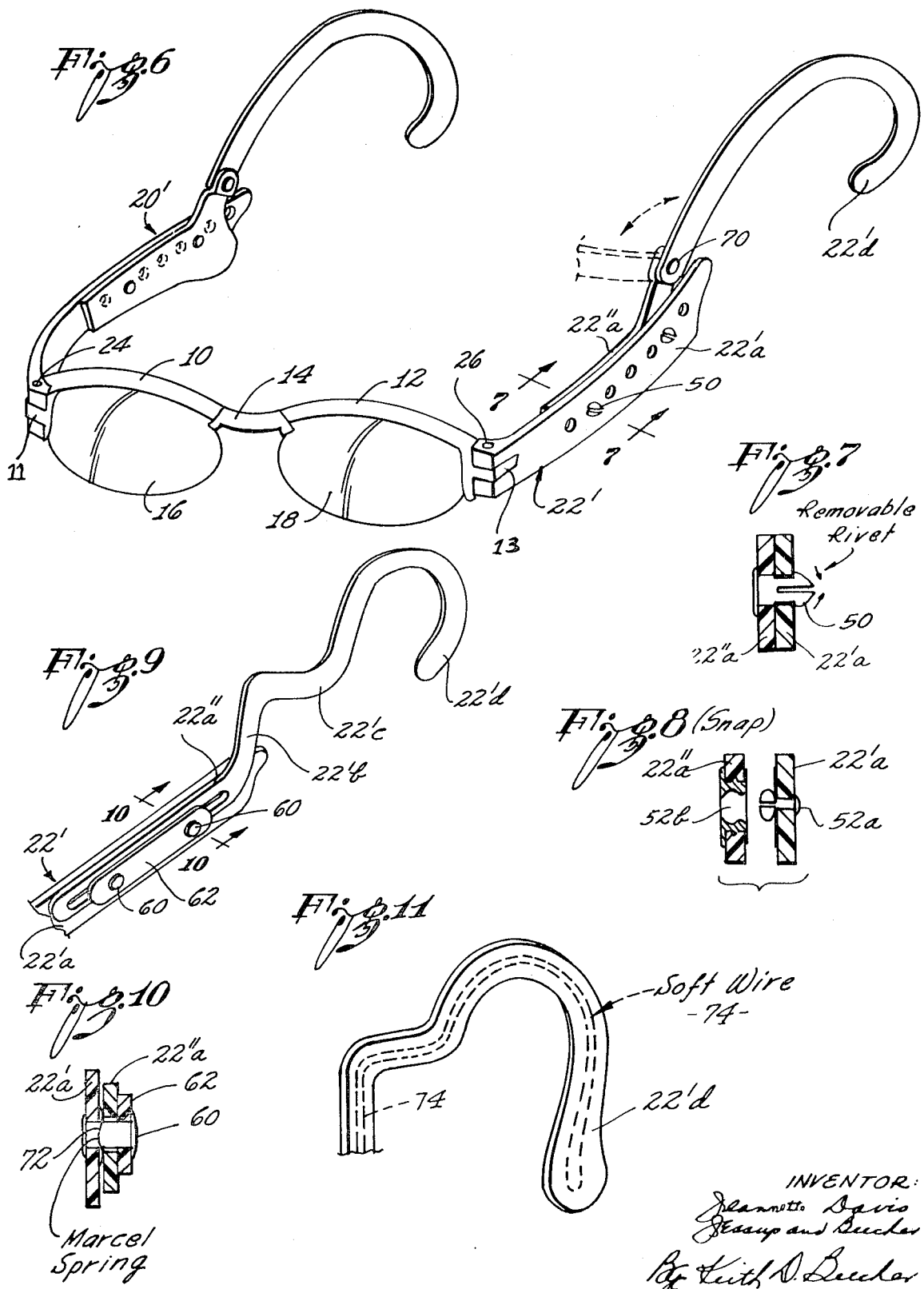

3,620,608

EYEGLASS ASSEMBLY

This application is a continuation-in-part of copending application, Ser. No. 762,799, now abandoned, which was filed Sept. 26, 1968, in the name of the present inventor.

BACKGROUND OF THE INVENTION

As is well known, the usual pair of spectacles includes a lens for each eye, a frame for mounting the lenses, and a pair of bows hinged to the ends of the frame and extending back along the sides of the wearer's head. In the prior art assemblies, for the most part, the bows serve to support the frame in place with its intermediate portion extending across the bridge of the wearer's nose so as to hold the lenses positioned before his eyes.

Most eyeglasses in the prior art are constructed in the manner described in the preceding paragraph so as to be supported by the bridge of the wearer's nose. This method of support, however, is often deficient in that the assembly tends to slip down off the bridge of the nose. In addition, the aforesaid method of support used in the prior art spectacles is often uncomfortable, and marks are formed in the bridge of the nose, especially when the eyeglasses have been worn continuously for any length of time.

U.S. Pat. No. 3,006,247 which issued Oct. 21, 1961, in the name of the present inventor, describes and claims an improved eyeglass assembly, and one which is relatively light, and which supported by the sides of the wearer's head in a position displaced up from the nose. Such eyeglasses may be worn for long intervals of time without producing discomfort and without disfiguring the bridge of the wearer's nose.

A more recent U.S. Pat. No. 3,361,514 which issued Jan. 2, 1968, in the name of the present inventor, likewise describes such an eyeglass assembly. The eyeglasses of the latter patent, as a specific feature, have extensible bows to facilitate the folding of the spectacles into a compact space when they are not in use.

The eyeglass assembly to be described herein has a construction such that, as is the case with the eyeglasses of the aforementioned patents, it permits the assembly to be worn comfortably by the wearer out of contact with the nose. Moreover, the eyeglasses of the present invention are constructed to have bows shaped in a manner such that the eyeglasses are firmly supported in position out of contact with the wearer's nose, and have no tendency whatever to slip down against the nose, even when the wearer is running, dancing, jumping, or subjecting his head to the most violent movements.

A feature of the invention is the simplicity with which the desirable features described in the previous paragraph are achieved. The aforesaid features are accomplished by the appropriate configuration and resiliency of the side bows, as will be described herein.

The eyeglass assemblies to be described herein have been found to provide a complete and adequate support for eyeglass lenses, and the assemblies may be worn comfortably by the wearer, with the wearer hardly being aware that the glasses are being worn. The illustrated configuration of the side bows permits the assembly to be worn with the bows pressed against the sides of the head, and causes the eyeglasses to be supported in a cantilever manner in their proper position before the eyes of the wearer. It has been found that eyeglasses constructed in the manner to be described herein may be worn comfortably by the wearer, and even the most violent movements of the wearer's head fail to dislodge the eyeglasses from their desired operative position before the eyes of the wearer.

The eyeglasses of the invention are equally suitable for men and women. The eyeglasses may be pushed up over the hair, when not in use, if so desired, and are adequately held in that position. The eyeglasses to be described are light, comfortable and inexpensive.

BRIEF DESCRIPTION OF THE DRAWINGS

FIG. 1 is a perspective view of one embodiment of the invention, showing the assembly in place before the eyes of a wearer;

FIG. 2 is a further view of the assembly of FIG. 1 in a folded closed position;

FIG. 3 shows a further embodiment in which the bows are integral with the front frame of the eyeglasses;

FIG. 4 is a side view of the assembly of FIG. 3, both FIGS. 3 and 4 showing the eyeglass assembly being worn on the head of a user;

FIG. 5 is a top plan view of the eyeglass assembly of FIGS. 3 and 4, showing the manner in which the bows are arcuately shaped to provide pressure points for the temples of the wearer;

FIG. 6 is a perspective view similar to FIG. 1, and showing a further embodiment of the invention in which the side bows are adjustable to any desired length, so as to fit different head sizes;

FIG. 7 is a cross-sectional view of one of the bows assemblies of FIG. 6 taken along the line 7—7 of FIG. 6;

FIG. 8 is a view, like FIG. 7, but showing a modified snap fastener means for attaching two sections of the bow assembly together at adjustable bow lengths;

FIG. 9 is a fragmentary perspective view of a bow assembly which is different from the assembly of FIG. 6 in some respects;

FIG. 10 is a cross-sectional view taken along the line 10—10 of FIG. 9; and

FIG. 11 is a fragmentary view of a looped end portion of a bow, showing a modified construction.

DETAILED DESCRIPTION OF THE ILLUSTRATED EMBODIMENTS

The assembly shown in FIGS. 1 and 2, for example, includes a pair of lens-receiving portions 10 and 12 which are intercoupled by an intermediate portion 14. A pair of lenses 16 and 18 are supported in the lens-receiving portions 10 and 12. A pair of side bows 20 and 22 are hinged to the ends of the portions 10 and 12, respectively, by appropriate hinges 24 and 26. The hinges support the side bows 20 and 22, so that the side bows are normally biased against the sides of the head of the wearer.

The assembly of FIG. 1 may be folded in the manner shown in FIG. 2 when not in use. The teachings of U.S. Pat. No. 3,361,514 referred to above may be incorporated in the assembly of the invention, in that the side bows 20 and 22 may be made extensible, if so desired, to facilitate the folding process. Moreover, and as described in conjunction with FIGS. 6–10, for example, the length of the individual side bows may be made adjustable, so that the glasses may be easily adjusted to fit different head sizes.

As illustrated particularly in FIGS. 1 and 2, the bows 20 and 22 have a stepped configuration, and each includes a first section 22a, which extends essentially horizontally back from the respective hinges 24 and 26 to the temple of the wearer. The section 22a has an arcuate configuration, when viewed in plan (such as in FIG. 5), so that each of these sections is biased against the temple of the wearer by the hinges. Each of the bows has an intermediate section 22b, for example, which extends up in a generally vertical direction, as shown in FIGS. 1, 3 and 4, but displaced a little back from the vertical when the glasses are being worn. Each of the side bows has a third section, such as the section 22c in FIG. 1, which extends down at an inclination to the horizontal and back toward the top of the wearer's ear, as shown in FIGS. 3 and 4. Finally, each of the bows may have a looped end section, such as designated 22d which loops around the back of the ear.

When the eyeglasses described above are worn by a user, the bows firmly engage the sides of his head, and the structural tendency of the assembly is such that the lenses 16 and 18 are supported in a cantilever manner in front of the eyes of the wearer. With the illustrated construction, there is no tendency whatever for the eyeglasses to droop down over the nose, or for the assembly to become displaced, regardless of the movements of the wearer.

It is contemplated that the various components of bows and frame portions described above, may be composed of a resilient light plastic, or other suitable material. The assemblies may be made integral, for example, as shown in FIGS. 3, 4 and 5, in which the bows 20 and 22, the lens-receiving portions 10 and 12, and the intermediate portion 14 are all composed of one-piece of a suitable light resilient plastic material.

The manner in which the assembly is held in place is clearly shown in FIG. 4. FIG. 5, on the other hand, shows the arcuate nature of the first linear sections 22a of the bows which cause the ends of such sections to be resiliently biased against the cheeks or temples of the wearer.

In the embodiment of FIG. 6 the side bows are designated 20' and 22', and each includes a first linear section 22a' which has a series of holes extending along its length, as shown. In the latter embodiment, each bow has a two-piece configuration, with the rear section being pivotally mounted on a further linear section designated, for example, 22a''. The two sections 22a' and 22a'' may be adjustable lengthwise, so as to permit the bows to be set for different head sizes. The two sections 22a' and 22a'' are held together, for example, by rivets 50 (FIG. 7), or by snap fasteners 52a, 52b (FIG. 8).

The rear part of the bow is shown as pivoted to the forward part by means of a pivot 70 in FIG. 6. The pivot 70 may be held tightly within the assembly, so as to provide a friction fit between the two sections. The rear section of each bow may then be turned to an appropriate comfortable position, depending upon the head of the user. As in the previous embodiment, integral stops 11 and 13 are formed on the ends of the lens receiving portions 10 and 12. These stops serve to limit the amount by which the respective bows may be turned about the hinges 24 and 26, and they serve to bias the bows inwardly against the head of the wearer.

In FIG. 9, the side bow, such as the side bow 22' is also adjustable. In the latter instance, the section 22a'' is provided with a slot, and a pair of pins 60 extend through the slot and through an additional strip 62. The pin 60 may be similar to the rivets 50, and may be fastened tightly when the rear section of the bow has been extended to a desired dimension relative to the head of the ultimate user. The pins 60 may be spring loaded, by means of a "marcel" spring 72 (FIG. 10).

The bows 20', 21', and particularly the rear portion, such as the portion 22'd in FIG. 11, may be formed of a soft pliable plastic, and a soft flexible wire 74 may be embedded, either along the entire bow, or only in the rear section, so as to permit the bow to be shaped to any desired configuration most comfortably to fit the head and ears of the wearer.

The invention provides, an improved and simplified eyeglass assembly which is light, comfortable and inexpensive. Moreover, the assembly of the invention may be worn comfortably for long intervals of time, and has no tendency whatever to become displaced, regardless of the violent activity in which the wearer may be engaged.

While particular embodiments of the invention have been shown and described, modifications may be made, and it is intended in the following claims to cover all modifications which come within the scope of the invention.

What is claimed is:

1. In an eyeglass assembly adapted to be worn displaced from the nose of the wearer, and which includes a frame composed of light resilient material including a first lens-receiving portion and a second lens-receiving portion intercoupled by an intermediate portion, said intermediate portion serving as a bridge means for said first portion and said second portion; a pair of bows of a flat strip configuration and formed of a light resilient material hinged to the ends of respective ones of said first and second lens-receiving portions, each of said bows having a stepped configuration defining three distinct integral linear sections, a first of said sections extending essentially horizontally back to the temple of the wearer when the eyeglass assembly is in position, a second of said sections extending in an essentially vertical direction up from the end of said first section, and a third of said sections extending at an inclination down from the horizontal towards the top of the ears of the wearer, said first section of each of said bows being arcuately shaped towards the head of the wearer and including first and second portions which are adjustable longitudinally with respect to one another and said bows being resiliently biased by said frame against the sides of the head of the wearer, each of said bows having a further looped section integral with one end of said third section to extend around the ear of the wearer, with said first section of each of said bows having an end remote from said frame biased in against the temple of the wearer, and with the aforesaid second and third sections of each of said bows pressed into a firm flat engagement with the sides of the head of the wearer, so that the aforesaid frame is firmly supported in a cantilever manner before the eyes of the wearer with said intermediate portion out of contact with the nose of the wearer.

2. The assembly defined in claim 1, in which means are provided for fastening said first and second portions together in a particular longitudinal relationship with one another.

3. The assembly defined in claim 2, in which said fastening means take the form of a plurality of snap fasteners.

4. The assembly defined in claim 1, in which at least part of each of said bows is formed of a soft pliable plastic material, and which includes a flexible wire imbedded therein to permit the individual bows to be adjusted to any desired configuration.

5. The assembly defined in claim 1, in which said second section is pivotally mounted to said first section of each of said bows, so as to permit angular adjustment of said bows to fit the head and ears of the wearer.

* * * * *